(12) United States Patent
Geusendam

(10) Patent No.: US 9,680,294 B2
(45) Date of Patent: Jun. 13, 2017

(54) CONDUCTOR SYSTEM FOR USE IN A DIELECTRIC

(71) Applicant: EATON INDUSTRIES (NETHERLANDS) B.V., Hengelo (NL)

(72) Inventor: Paulus Geusendam, Hengelo (NL)

(73) Assignee: EATON INDUSTRIES (NETHERLANDS) B.V., Hengelo (NL)

( * ) Notice: Subject to any disclaimer, the term of this patent is extended or adjusted under 35 U.S.C. 154(b) by 0 days.

(21) Appl. No.: 14/654,551

(22) PCT Filed: Dec. 12, 2013

(86) PCT No.: PCT/EP2013/076420
§ 371 (c)(1),
(2) Date: Jun. 22, 2015

(87) PCT Pub. No.: WO2014/095584
PCT Pub. Date: Jun. 26, 2014

(65) Prior Publication Data
US 2015/0357807 A1    Dec. 10, 2015

(30) Foreign Application Priority Data
Dec. 20, 2012 (GB) .................................... 1223009

(51) Int. Cl.
*H01B 3/18*      (2006.01)
*H02G 5/06*      (2006.01)
*H01B 1/02*      (2006.01)
*H02G 3/04*      (2006.01)
*H02B 13/00*     (2006.01)

(52) U.S. Cl.
CPC ............ *H02G 5/061* (2013.01); *H01B 1/023* (2013.01); *H01B 3/18* (2013.01); *H02B 13/005* (2013.01); *H02G 3/0462* (2013.01)

(58) Field of Classification Search
USPC .................................. 174/70 B; 439/89, 252
See application file for complete search history.

(56) References Cited

U.S. PATENT DOCUMENTS 3,571,783 A * 3/1971 Lusk ...................... H01R 31/00
                                                                 174/21 R
2008/0207022 A1* 8/2008 Hughes .................. H01R 13/53
                                                                      439/89

FOREIGN PATENT DOCUMENTS

DE           2624325 A1      3/1977
DE           19653676 C1     1/1998
(Continued)

*Primary Examiner* — Timothy Thompson
*Assistant Examiner* — Krystal Robinson
(74) *Attorney, Agent, or Firm* — Leydig, Voit & Mayer, Ltd.

(57) ABSTRACT

A conductor system for use in a surrounding dielectric has a first member with a first conductive surface having a first edge and arranged to be in contact with the surrounding dielectric; a second member arranged such that there is a gap between the first member and the second member at the first edge; and a protector arranged to be partially held in the gap by elastic forces in the protector and having a conductive protector surface arranged to be pressed against the first edge by the elastic forces and arranged to protrude out of the gap on the side of the first member.

11 Claims, 6 Drawing Sheets

(56) References Cited

FOREIGN PATENT DOCUMENTS

| | | | |
|---|---|---|---|
| DE | 10119333 C1 * | 5/2002 | ........... H01R 13/748 |
| EP | 2568553 A1 | 3/2013 | |
| JP | 2009261215 A | 11/2009 | |

* cited by examiner

CONDUCTOR SYSTEM FOR USE IN A DIELECTRIC

CROSS-REFERENCE TO RELATED APPLICATIONS

This application is a U.S. national stage application under 35 U.S.C. §371 of International Application No. PCT/EP2013/076420, filed on Dec. 12, 2013, and claims benefit to British Patent Application No. 1 223 009.0, filed on Dec. 20, 2012. The International Application was published in English on Jun. 26, 2014, as WO 2014/095584 A1 under PCT Article 21(2).

FIELD

The invention relates to lowering the electric field strength around an edge of a first member of a conductor system.

BACKGROUND

In a prior art busbar chamber (Paper 0688 of the 19th International Conference on Electricity Distribution) two busbars are placed in voltage divider systems. The busbars are isolated by placing them in busbar tanks filled with SF6 gas. A connecting block connects the ends of the busbars and a sleeve is mounted over the edges of the busbars. The inner surface of the sleeve faces the busbars and is on busbar potential by means of semi-conductive control electrodes. This way the electrical field in the silicone sleeve is controlled.

The outer surface is connected to earth via pressure rings and a pressure frame.

The sleeve is mounted by deforming the sleeve, which is made of silicone elastomer.

SF6 gas is highly toxic and may escape from the tanks, for instance during maintenance or during operations due to leaks. Regular checks on the SF6 content of the busbar tanks are necessary because when SF6 gas has escaped from the tanks, the isolation of the busbars has changed. Also, the construction requires quite some components and is expensive.

A further conductor system is known from DE10119333C1.

SUMMARY

An aspect of the invention provides a conductor system for use in a surrounding dielectric, the system comprising: a first member including a first conductive surface including a first edge, the first member being arranged to be in contact with the surrounding dielectric; a second member arranged such that there is a gap between the first member and the second member at the first edge; and a protector arranged to be partially held in the gap by elastic forces in the protector, the protector including a conductive protector surface arranged to be pressed against the first edge by the elastic forces, the conductive protector surface being arranged to protrude out of the gap on a side of the first member, wherein at least one of the first member and the second member has an elongated shape, and wherein the protector is a ring arranged to be slid along the set member.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
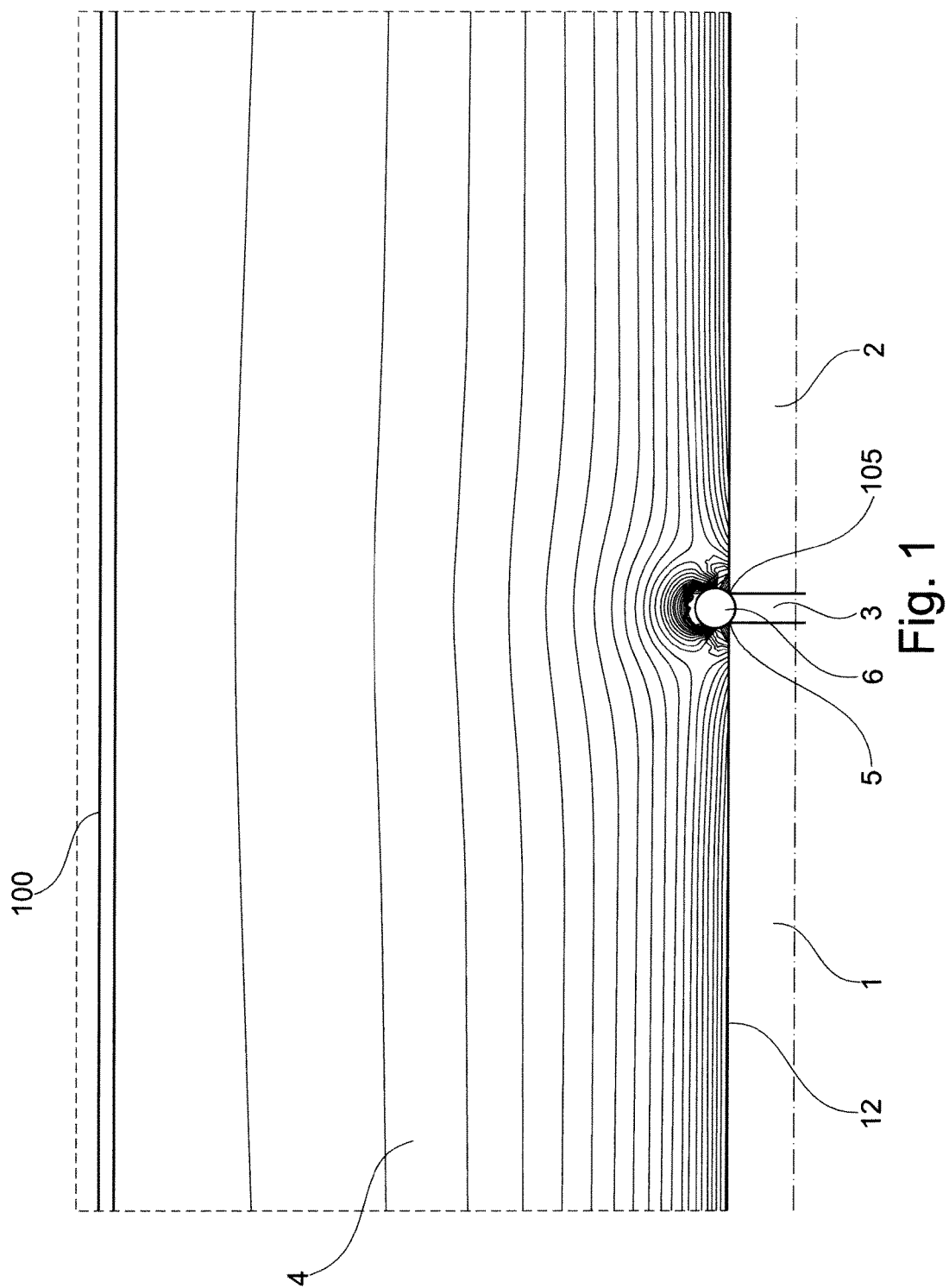
FIG. 1 depicts an embodiment of the invention.

An aspect of the invention to at least partially solves one or more of the problems discussed in the background.

An aspect of the invention is embodied in a conductor system for use in a surrounding dielectric comprising a first member with a first conductive surface having a first edge and arranged to be in contact with the surrounding dielectric, a second member arranged such that there is a gap between the first member and the second member at the first edge and a protector arranged to be partially held in the gap by elastic forces in the protector and having a conductive protector surface arranged to be pressed against the first edge by the elastic forces and arranged to protrude out of the gap on the side of the first member.

As the conductive protector surface is pressed against the first edge by elastic force and with the conductive protector surface being conductive, the conductive protector surface has the same potential as the first member at the first edge. Because the conductive protector surface protrudes out of the gap on the side of the first member, the conducting surface and the first conductive surface at the edge surround a part of the surrounding dielectric. Moreover, the field strength is low. This is because in a dielectric between perfect conductors with parallel surfaces the field strength is zero as the electric field has to be perpendicular to the surface of a perfect conductor and there is no difference in potential between the perfect conductors in the direction perpendicular to the surface. Therefore even in non-ideal situations (for instance with non-ideal conductors, i.e. real conductors or non-ideal surrounding dielectric or the first conductive surface and the conductive protector surface not being parallel), the field strength will be low. Also, the low field strength is less dependent of the potential of other elements with which the surrounding dielectric is in contact. Therefore, the design of the end parts of the first conductor is less important to avoid sharp edges for avoiding potentially high field strengths related to high potential differences between the first conduction member and other elements the dielectric may be in contact with. Low field strength relates to a low risk for undesired reactions in a dielectric surrounding the first member (using free charge particles of the first member) and to low risk of arcs, which are undesired short circuits. Because these risks are low, a gas such as ambient air may be used as dielectric to surround the first and second member, with reduced risk of the formation of $O_3$ or arcs.

According to a further embodiment of the invention, at least one set member of a set comprising the first member and the second member has an elongated shape and the protector is a ring arranged to be slid along the set member.

Because the protector is a ring, it can be moved along elongate objects. Because the set member is an elongate object, the ring can be slid along the set member and it can be positioned on that set member for maintenance or installation purposes (for instance for installing a connector between the first member and the second member for carrying current) and then slid to the gap to form the conductor system of the invention. In the gap the protector will decrease in diameter because of the elastic forces. Because of the elastic forces, the ring can also be fixed when slid over the set member, so that it is out of the way during maintenance or installation activities. Because the protector is held in the gap by elastic forces, the position of the protector is fixed during operation, contributing to a reliable performance.

According to a further embodiment of the invention the conductive protector surface surrounds a tube of conductive material arranged parallel to the centreline of the ring and wherein the tube has cross section perpendicular to the centreline with a radius of curvature which is larger than the gap.

Because the radius of curvature is larger than the gap the conductive material protrudes out of the gap and the angle between the first conductive surface and the conductive protector surface is reduced. By reducing the angle, there field strength in the surrounding dielectric is reduced at larger distances from the edge. In addition, the field strength on the conducting surface away from the edge depends on the radius of curvature of the tube. As this is larger than the gap, the field strength is relatively low.

According to a further embodiment, the tube comprises at least one material from the set of materials comprising rubber, silicone rubber, thermoplastic elastomeric material or thermoplastic urethane.

These materials are relatively cheap and have elastic properties. Moreover, silicone rubber can easily and at low cost be provided with conductive properties using graphite particles.

According to a further embodiment, the ring comprises a sleeve having a lower conductance than the conductive material, the sleeve partially enclosing the tube of conductive material and arranged to be in contact with the surrounding dielectric.

Because the sleeve only partially encloses the conductive material, the conductive material can make contact to the first edge and function as described to lower the field strength in the surrounding dielectric. Because the sleeve conducts less well than the conducting material, in case there is a difference in potential between the conductive material and other materials with which the surrounding dielectric is in contact, the difference in potential between the other material and the protector is lower than the difference in potential between the first member and the other material. Correspondingly there will be an electric field strength in the sleeve of the protector. Where the protector and the first member do not surround the surrounding dielectric because of their limited sizes, there may still be a high field strength in the surrounding dielectric in the area where the surrounding dielectric is in contact with the protector in the in the surrounding dielectric. As the sleeve conducts less well than the conducting surface, there are less free charge carriers available and the risk for arcs is lowered. Additionally, the field strength in the dielectric around the sleeve depends on the shape of the sleeve and depends less on the shape of the conducting material such as the radius of curvature of the conducting material. Therefore the amount of conducting material can be kept low. As the conductive material is more expensive than the sleeve material, this is cost efficient.

According to a further embodiment, the sleeve is made from at least one of rubber, silicone rubber, thermoplastic elastomeric material or thermoplastic urethane.

Apart from having a low conductance, these materials can withstand high voltages without breaking down, i.e. it has low safety risks. Silicone rubber is a relatively cheap material to use, is elastic and is hardly influenced by ageing, which contributes to a reliable performance.

According to a further embodiment, the sleeve has an outer surface arranged to be in contact with the surrounding dielectric, the outer surface having a radius of curvature in a cross section perpendicular to the centerline larger than the radius of curvature of the tube of conductive material.

Field strengths are high where there are small radii of curvature. Because the radius is even larger than that of the conductive material, the field strength at the outer surface is further reduced.

According to a further embodiment wherein the second member comprises a second conductive surface arranged to be in contact with the surrounding dielectric, the second conductive surface comprising a second edge, the conductor system comprises a connector for electrically connecting the first member and the second member, wherein the conductive protector surface is arranged to be pressed against the second edge by elastic forces in the protector and to protrude out of the gap on the side of the second member.

In this embodiment the second member is at the same potential as the first member because of the connector. Therefore the conductive protector surface of the protector can also make contact with the second edge, without the need to arrange the protector to be capable of carrying current between the first member and the second member. Because the conductive protector surface is at the same potential as the second edge and protrudes out of the gap on the side of the second member, the conductive protector surface and the second conductive surface enclose a part of the surrounding dielectric. In this part of the dielectric, the field strength is low because the conductive protector surface and the second conductive surface are at the same potential.

In an embodiment of the invention, a first busbar (1) and a second busbar (2) are positioned in an air-insulated medium voltage switchgear system, for use up to 24 kV. The embodiment is depicted in FIG. 1. The first busbar (1) and the second busbar (2) are made of aluminum. Between the first busbar (1) and the second busbar (2) there is a gap (3). In the gap (3) and in the space (4) surrounding the first busbar (1) and the second busbar (2) there is air, which is a dielectric gas. The air is enclosed in a panel (100). Protruding from the gap (3) there is a protector (6) for directing the electrical field.

Without the protector (6) the electric field strength at a first edge (5) of the first busbar (1) and at the second edge (105) of the second busbar (2) can be very high. The field strength will be high when the first edge (5) and the second edge (105) are sharp and when the electric potential (further called potential) of the first busbar (1) and the second busbar (2) is high with respect to the potential of the panel (100). Although medium voltage systems for instance operate at a voltage of 24 kV, medium voltage systems are tested at much higher voltages for safety reasons. At such high voltages, air near to the first edge (5) and the second edge (105) experiences such high field strength, that undesired reactions occur and for instance the toxic $O_3$ is formed. Worst case, arcs are formed. Without the protector (6) in the gap (3) between the first busbar (1) and the second busbar (2), the electric field strength has a very low value, except at minor depth.

Figure 2:
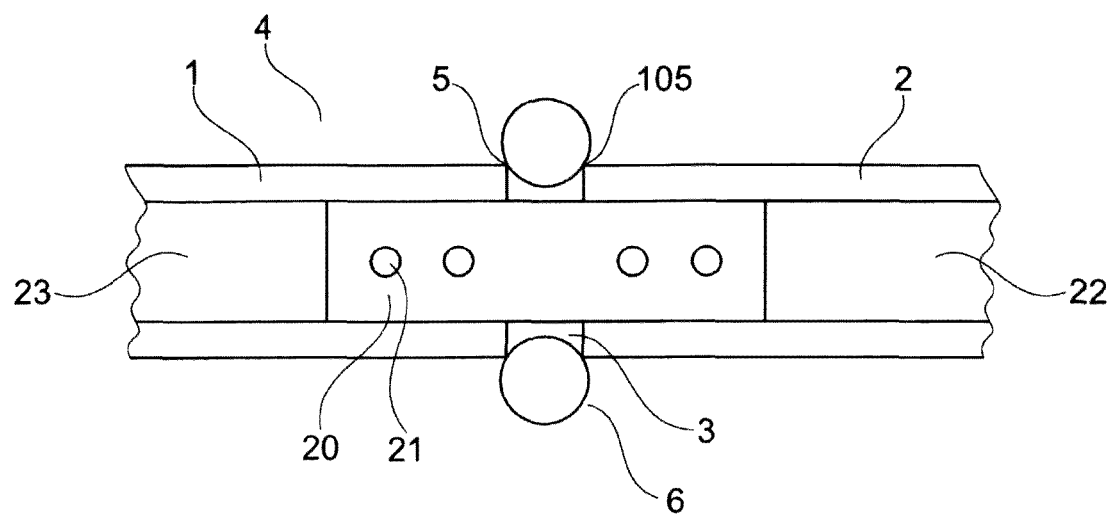
FIG. 2 depicts the embodiment of the invention including details of the connection between the first and the second conductor.

In the embodiment however (see FIG. 1), the protector (6) is pressed against the edge (5) of the first conductor (1) and the second edge (105) of the second conductor (2). The first conductor (1) and the second conductor (2) are at the same electric potential by means of a connector block (20). This is shown in FIG. 2. Because the protector (6) is pressed against the first edge (5) and the second edge (105), it is at the same electric potential as the first conductor (1) and the second conductor (2).

The first busbar (1) has a first conductive surface (9) which is in contact with the air in the space (4) around the first busbar (1) and the second busbar (2). As the protector (6) protrudes out of the gap, the electric field in the air close to the first conductive surface (9) and the protector (6) is not only determined by the electric potential of the first conductive surface (9) but also by the potential and the shape and conductivity of the protector (6).

Figure 3:
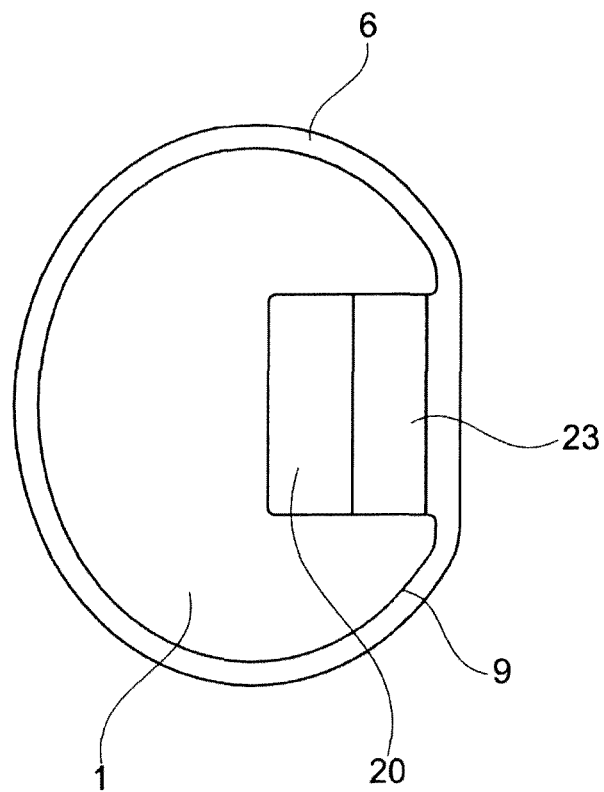
FIG. 3 depicts the embodiment of the invention in a cross section view.

The protector (6) forms a ring around the end parts of the first busbar (1) and the second busbar (2) which each have an elongated shape. A side view of the conductor system is shown in FIG. 3. The first busbar (1) comprises a first recess (23) along its direction of elongation. A connection block (20) is mounted in the recess (23) and is fixed to the first busbar (1) with two bolts (21) or other fastening means. The second busbar comprises a second recess (22) along its direction of elongation. This is also shown in FIG. 2. (The connection block is not shown in FIG. 1). The connection block (20) is also mounted in the second recess and fixed to the second busbar (2) with two bolts (21).

The radius of the protector (6) in the cross section of the protector (6) perpendicular to the centerline of the ring, is larger than the gap. This is shown in FIG. 1. The protector comprises silicone rubber and graphite to give the silicone rubber conductive properties. Because the radius is larger and the protector (6) is conductive, the ambient air (4) close to the first edge (5) is surrounded on one side by the first conductive surface (9) and on another side by the conductive protector surface of the protector (6). The same situation applies to the ambient air (4) close to the second edge (105). In FIG. 1, in the ambient air (4) lines are drawn representing positions with the same value for the electric field, i.e. positions with equal electric field strength. When the lines are close to each other, the local difference in electrical field strength is high and correspondingly the local difference in potential is high. Because the first conductor surface (9) is at a certain potential, the lines representing equal field strength close to the first conductor surface (9) are parallel to the first conductor surface (9). Close to the gap and the protector there is a disturbance of this pattern.

In a conductor, such as the first busbar (1), the second busbar (2) and the conductive protector (6) the electric field strength is very low (the more ideal the conductive properties, the lower the electric field strength). For the purpose of explaining the invention, it will be assumed that the influence of non-idealistic behavior is negligible. In between the first conductor (1) and the second conductor (2) the field strength is zero because the first conductor and the second conductor are at the same potential.

Figure 4:
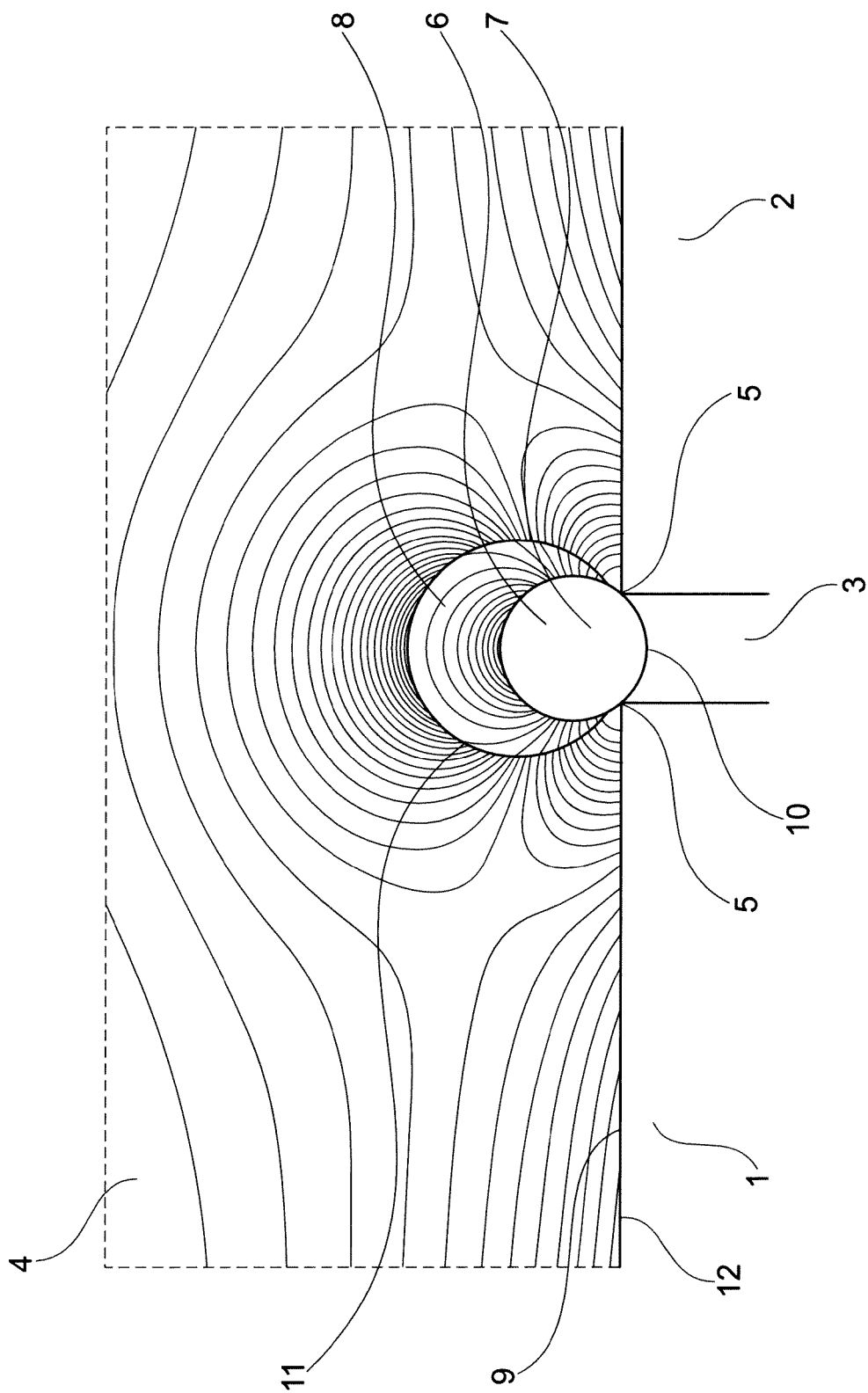
FIG. 4 depicts a further embodiment of the invention.
Figure 5:
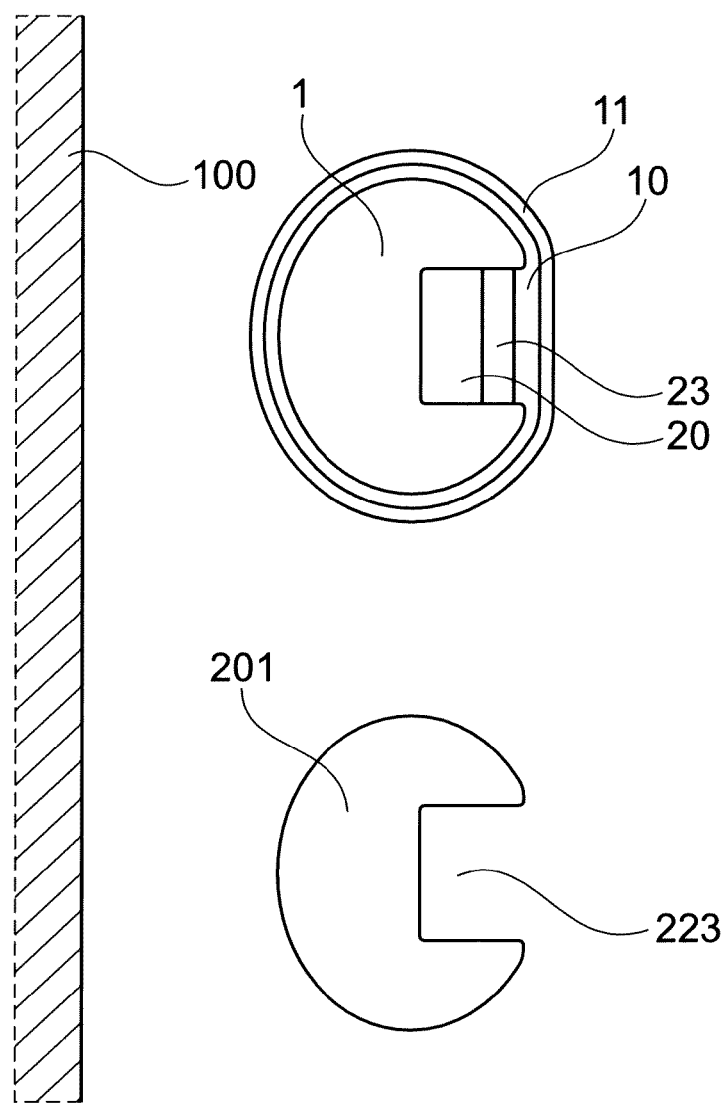
FIG. 5 depicts the further embodiment in a side view.

In a further and preferred embodiment, the protector (6) comprises a sleeve (8) of non-conductive silicone rubber and a conductive part (7). The embodiment further corresponds to the embodiment as described above. In FIG. 4, a cross section of the protector (6) with non-conductive sleeve (8) is shown. The conductive part (7) has a conductive protector surface (10). The conductive protector surface is pressed against the first edge (5) and the second edge (105). The non-conductive sleeve (8) has a non-conductive surface (11). FIG. 5 shows a side view of the conductor system of this embodiment. The first busbar (1) and the second busbar (2) are connected by a block of conducting material, in this case copper.

FIG. 4 also depicts lines indicating positions of equal electric field strength. For the purpose of explaining the invention, non-idealistic behavior is considered negligible as well. In the cavity between the first conductive surface (9) and the conducting surface (10) the field strength is lowest and it increases in outward direction.

Far away from the gap (3) at a remote position (12) the electric field strength is at an average level close to the first conductive surface (9). The electric field strength decreases at larger distances from the first conductive surface (9) in a direction perpendicular to the first conductive surface (9).

Figure 6:
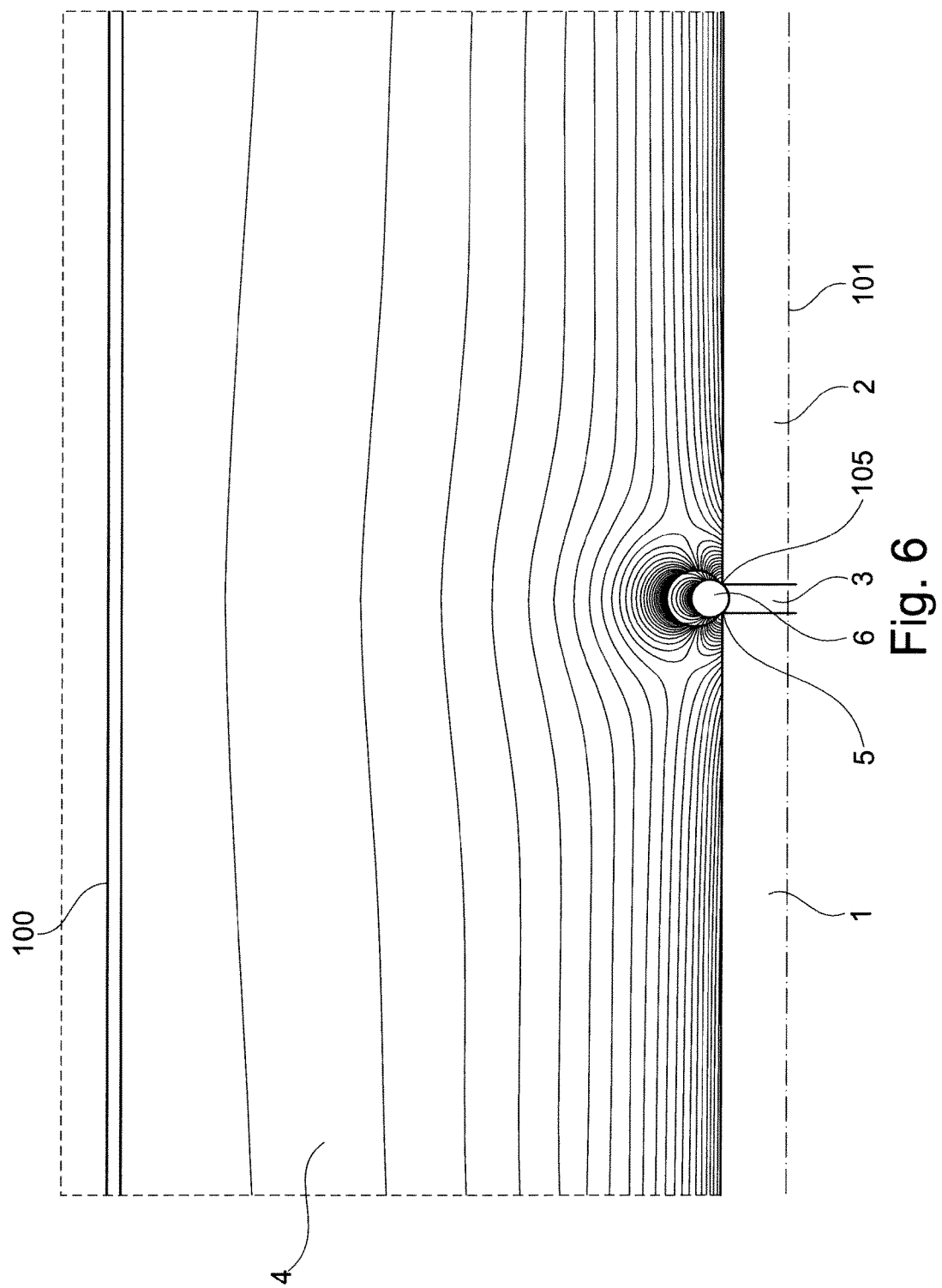
FIG. 6 depicts the further embodiment including a panel.

Because in the non-conductive sleeve (8) there is no transport of electrons, there is a difference in potential between the conductive part (7) and non-conductive surface (11) in case the panel (100) is at a different potential than the first conductor (1) and the second conductor (2). The configuration including the panel (100) is shown in FIG. 5. Because there is a difference in potential, lines of equal electric field strength are shown in the non-conductive sleeve (8) in FIG. 4 and in FIG. 6. The interrupted line (101) in FIG. 6 indicates a plane of symmetry. Both in FIG. 4 and FIG. 6 the connection block (20) is not shown.

The protector (6) is made from silicone rubber, which can withstand high field strengths without negative safety risks as forming toxic material, rupture etc. Therefore, the electric field strength in the non-conductive sleeve (8) may be at a medium level (for instance 30.000 kV/cm) without safety risks.

The air in the space (4) surrounding the first busbar (1) and the second busbar (2) close to the non-conductive sleeve (8) experiences an electric field determined by the shape and electric properties of the sleeve. Where the non-conductive sleeve (8) faces away from both the first busbar (1) and the second busbar (2) in the direction of the panel (100), the influence of the first busbar and the second busbar (2) on the electric field strength is relatively small. Although the field strength may still be high, it is lower than at the edges (5) in case the protector (6) would not have been present.

Figure 7:
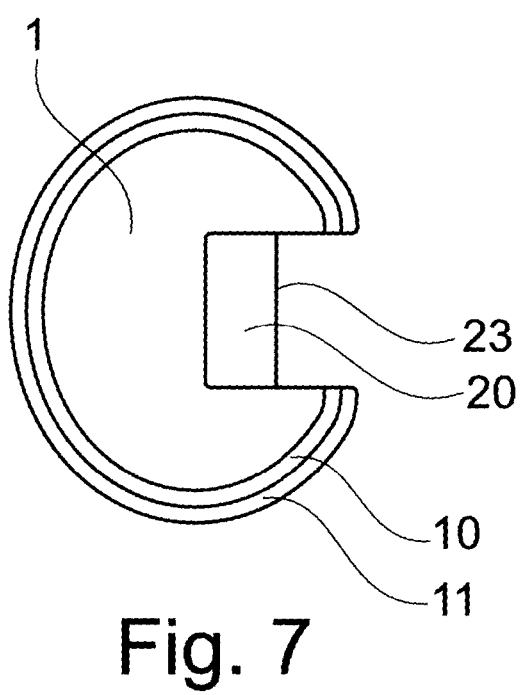
FIG. 7 depicts another embodiment of the invention.

While specific embodiments of the invention have been described above, it will be appreciated by the person of ordinary skill in the art that the invention may be practiced otherwise than as described, but still according to the teachings above. The description is intended to be illustrative, not limiting. For instance, the busbars may be rectangular or circular in cross section or have other shape cross-sections. Also, the protector may contact one busbar with a conducting surface and the other busbar with a non-conducting surface. Furthermore, the conductive part of the ring may not be circular in cross section. Also the non-conductive surface (11) may not have a circular shape. Furthermore, the protector may not cross the cavity (23) running along the length of the first busbar (1). This is illustrated in FIG. 7. In such a case the protector (6) may be kept in place using glue or other means (not shown).

Furthermore, the conductors may not be busbars, or one of them may not be a busbar. For instance, the invention can also be embodied by a busbar and a bolt that is connected to and sticks out of the busbar such that there is a gap between the head of the bolt and the busbar. The protector is present in the gap between the head of the bolt and the busbar.

The protector may be from silicone rubber, but may also be made from rubber or a thermoplastic elastomer or tpu (thermoplastic polyurethane).

Also the panel (100) may comprise 3 busbar (1) in a row. In FIG. 5 a further busbar (201) is drawn at a distance from the first busbar (1). The first busbar (1) and the further busbar (201) may be used to conduct different poles or equal poles to be able to conduct more current. In FIG. 5 the further busbar (201) is shown without corresponding connector block and without a protector. However both may be applied.

Also, for instance in an embodiment, the first busbar (1) and the second busbar (2) may have an oxidation layer in contact with the surrounding medium.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A conductor system for use in a surrounding dielectric, the system comprising:
a first member including a first conductive surface including a first edge, the first member being arranged to be in contact with the surrounding dielectric;
a second member arranged such that there is a gap between the first member and the second member at the first edge; and a protector arranged to be partially held in the gap by elastic forces in the protector, the protector including a conductive protector surface arranged to be pressed against the first edge by the elastic forces, the conductive protector surface being arranged to protrude out of the gap on a side of the first member,
wherein at least one of the first member and the second member has an elongated shape, and
wherein the protector is a ring arranged to be slid along the respective member.

2. The system of claim 1, wherein the conductive protector surface surrounds a tube of conductive material arranged parallel to a centerline of the ring, and
wherein the tube has a cross section perpendicular to the centerline with a radius of curvature which is larger than the gap.

3. The system of claim 2, wherein the second member includes:
a second conductive surface arranged to be in contact with the surrounding dielectric; and
a second edge,
wherein the conductor system further comprises a connector configured to electrically connect the first member and the second member, and
wherein the conductive protector surface is arranged to be pressed against the second edge by elastic forces in the protector and to protrude out of the gap on a side of the second member.

4. The system of claim 2, wherein the tube includes rubber, silicone rubber, thermoplastic elastomeric material, thermoplastic polyurethane, or a mixture of two or more of any of these.

5. The system of claim 1, wherein the second member includes:
a second conductive surface arranged to be in contact with the surrounding dielectric; and
a second edge,
wherein the conductor system further comprises a connector configured to electrically connect the first member and the second member, and
wherein the conductive protector surface is arranged to be pressed against the second edge by elastic forces in the protector and to protrude out of the gap on a side of the second member.

6. A conductor system for use in a surrounding dielectric, the system comprising:
a first member including a first conductive surface including a first edge, the first member being arranged to be in contact with the surrounding dielectric;
a second member arranged such that there is a gap between the first member and the second member at the first edge; and a protector arranged to be partially held in the gap by elastic forces in the protector, the protector including a conductive protector surface arranged to be pressed against the first edge by the elastic forces, the conductive protector surface being arranged to protrude out of the gap on a side of the first member,
wherein at least one of the first member and the second member has an elongated shape,
wherein the protector is a ring arranged to be slid along the respective member,
wherein the conductive protector surface surrounds a tube of conductive material arranged parallel to a centerline of the ring,
wherein the tube has a cross section perpendicular to the centerline with a radius of curvature which is larger than the gap,
wherein the ring includes a sleeve having a lower conductance than the conductive material, and
wherein the sleeve is arranged to partially enclose the tube of conductive material and to be in contact with the surrounding dielectric.

7. The system of claim 6, wherein the sleeve is made from a material including rubber, silicone rubber, thermoplastic elastomeric material, thermoplastic urethane, or a mixture of two or more of any of these.

8. The system of claim 7, wherein the sleeve includes an outer surface arranged to be in contact with the surrounding dielectric, wherein the outer surface has a radius of curvature in a cross section perpendicular to the centerline larger than the radius of curvature of the tube of conductive material.

9. A conductor system for use in a surrounding dielectric, the system comprising:

a first member including a first conductive surface including a first edge, the first member being arranged to be in contact with the surrounding dielectric;

a second member arranged such that there is a gap between the first member and the second member at the first edge; and a protector arranged to be partially held in the gap by elastic forces in the protector, the protector including a conductive protector surface arranged to be pressed against the first edge by the elastic forces, the conductive protector surface being arranged to protrude out of the gap on a side of the first member, wherein at least one of the first member and the second member has an elongated shape, wherein the protector is a ring arranged to be slid along the respective member, wherein the conductive protector surface surrounds a tube of conductive material arranged parallel to a centerline of the ring, wherein the tube has a cross section perpendicular to the centerline with a radius of curvature which is larger than the gap, wherein the tube includes rubber, silicone rubber, thermoplastic elastomeric material, thermoplastic polyurethane, or a mixture of two or more of any of these, wherein the ring includes a sleeve having a lower conductance than the conductive material, and wherein the sleeve is arranged to partially enclose the tube of conductive material and to be in contact with the surrounding dielectric.

10. The system of claim 9, wherein the sleeve is made from a material including rubber, silicone rubber, thermoplastic elastomeric material, thermoplastic urethane, or a mixture of two or more of any of these.

11. The system of claim 10, wherein the sleeve includes an outer surface arranged to be in contact with the surrounding dielectric, and wherein the outer surface has a radius of curvature in a cross section perpendicular to the centerline larger than the radius of curvature of the tube of conductive material.

* * * * *